US012057655B2

(12) United States Patent
Toyoda et al.

(10) Patent No.: US 12,057,655 B2
(45) Date of Patent: Aug. 6, 2024

(54) PROTECTOR, WIRE HARNESS, AND ATTACHMENT METHOD FOR WIRE HARNESS

(71) Applicant: Yazaki Corporation, Tokyo (JP)

(72) Inventors: Ryohei Toyoda, Aichi (JP); YoungHo Jang, Aichi (JP); Hidetoshi Hamada, Tokyo (JP); Ryo Matsubayashi, Tokyo (JP)

(73) Assignee: YAZAKI CORPORATION, Tokyo (JP)

( * ) Notice: Subject to any disclaimer, the term of this patent is extended or adjusted under 35 U.S.C. 154(b) by 353 days.

(21) Appl. No.: 17/739,670

(22) Filed: May 9, 2022

(65) Prior Publication Data

US 2022/0368062 A1 Nov. 17, 2022

(30) Foreign Application Priority Data

May 13, 2021 (JP) ................................ 2021-081443

(51) Int. Cl.
*H01R 13/516* (2006.01)

(52) U.S. Cl.
CPC ................................ *H01R 13/516* (2013.01)

(58) Field of Classification Search
CPC ............ H01R 2201/26; H01R 13/5213; H01R 13/447; H01R 13/52; H01R 13/4538
See application file for complete search history.

(56) References Cited

U.S. PATENT DOCUMENTS 5,521,793 A * 5/1996 Dalgleish ................. H04B 1/38 361/752
6,576,838 B2 * 6/2003 Matsumura .......... H01H 85/044 439/522
7,435,093 B1 * 10/2008 Harmon ................. H01R 31/02 439/35
2002/0098718 A1 * 7/2002 Harmon ................... B60D 1/62 439/35
2003/0188882 A1 * 10/2003 Asao .................. H01R 13/4538 174/541
2007/0004274 A1 * 1/2007 Tabata ................. H01R 13/518 439/540.1
2008/0119074 A1 * 5/2008 Okano ............... H01R 13/4538 439/157
2009/0061291 A1 * 3/2009 Ohashi ................ H01M 50/591 361/837
2010/0178784 A1 * 7/2010 Shimizu ................... H01R 4/64 439/95
2010/0227511 A1 * 9/2010 Qian ........................ H01R 9/03 439/708

(Continued)

FOREIGN PATENT DOCUMENTS

JP 2015-154596 A 8/2015

*Primary Examiner* — Truc T Nguyen
(74) *Attorney, Agent, or Firm* — Sughrue Mion, PLLC

(57) ABSTRACT

A protector includes a base member and a cover member. The base member includes a pair of guide grooves extending along an attachment direction in which the cover member is attached to the base member and disposed on respective bilateral sides in a width direction perpendicular to the attachment direction, walls facing attachment direction-side ends of guide grooves in the attachment direction, and lock portions facing detachment direction-side ends of the guide grooves in a detachment direction.

5 Claims, 7 Drawing Sheets

(56) References Cited

U.S. PATENT DOCUMENTS

| | | | | |
|---|---|---|---|---|
| 2012/0315790 | A1* | 12/2012 | Hein | H01R 13/5812<br>439/574 |
| 2014/0342587 | A1* | 11/2014 | Wu | H01R 13/447<br>439/135 |
| 2015/0236432 | A1* | 8/2015 | Lin | H01R 13/5841<br>439/367 |
| 2020/0264381 | A1* | 8/2020 | Hu | G02B 6/3802 |
| 2023/0231340 | A1* | 7/2023 | Kobayashi | H01R 13/5833<br>439/445 |

* cited by examiner

PROTECTOR, WIRE HARNESS, AND ATTACHMENT METHOD FOR WIRE HARNESS

CROSS-REFERENCE TO RELATED APPLICATION(S)

The present application claims priority to and incorporates by reference the entire contents of Japanese Patent Application No. 2021-081443 filed in Japan on May 13, 2021.

BACKGROUND OF THE INVENTION

1. Field of the Invention

The present invention relates to a protector, a wire harness, and an attachment method for a wire harness.

2. Description of the Related Art

A vehicle such as an automobile includes a wire harness that mutually connects various devices in the vehicle. Such a wire harness includes a protector that protects a wiring member constituting the wire harness from the outside in some cases.

The protector has an accommodating space for accommodating the wiring member, and protects the wiring member by accommodating the wiring member in the accommodating space. This type of protector sometimes includes a cover member having an engagement claw, and a base member having an engagement hole that engages with the engagement claw (e.g., see Japanese Patent Application Laid-open No. 2015-154596).

In such a conventional protector, the cover member is provided with a plurality of the engagement claws, and the base member is provided with a plurality of the engagement holes. Each engagement claw is formed elastically deformable. First, in the conventional protector, the engagement claws are inserted into the respective engagement holes. After that, in the conventional protector, the cover member is moved toward the base member in an upper/lower direction, locking the engagement claws to the engagement holes, and closing an opening of the base member by the cover member. The cover member is thereby attached to the base member.

Unfortunately, in the conventional protector, the operation of inserting the engagement claws into the engagement holes and the operation of closing the opening of the base member by the cover member need to be performed separately. This makes the attachment operation complicated.

SUMMARY OF THE INVENTION

The present invention has been made in view of the above circumstances, and it is an object thereof to provide a protector, a wire harness, and an attachment method for a wire harness capable of facilitating an attachment operation of attaching a cover member to a base member.

To achieve the above object, a protector according to one aspect of the present invention includes a base member; and a cover member attached to the base member, wherein the base member includes a pair of guide grooves extending along an attachment direction in which the cover member is attached to the base member and disposed on respective bilateral sides in a width direction perpendicular to the attachment direction, a wall facing an attachment direction-side end of each of the guide grooves in the attachment direction, and a lock portion facing a detachment direction-side end of each of the guide grooves in a detachment direction opposite to the attachment direction, the pair of guide grooves have a pair of groove through openings facing each other in the width direction, the cover member includes a cover body having a cover opening, and a pair of guide projections formed projecting from an outer surface of the cover body, and inserted in the respective guide grooves through the groove through openings, and is movable along the attachment direction with respect to the base member with the guide projections inserted in the respective guide grooves, and the cover opening is closed by the base member when the cover member is moved to an attachment position set between the wall and the lock portion in the attachment direction, the wall faces an attachment direction-side end of each of the guide projections in the attachment direction, regulating movement of the cover member in the attachment direction, when the cover member is moved to the attachment position, the lock portion is formed elastically deformable, and comes into contact with each of the guide projections in an upper/lower direction to be in a retreating state while the cover member is moving along the attachment direction with the guide projections inserted in the guide grooves, and is separated from each of the guide projections in the upper/lower direction to be in an advancing state when the cover member is moved to the attachment position, and the lock portion is in the advancing state when the cover member is moved to the attachment position, and faces a detachment direction-side end of each of the guide projections in the detachment direction, regulating movement of the cover member in the detachment direction.

To achieve the above object, a wire harness according to another aspect of the present invention includes a first wiring member having a conductive first core wire; a second wiring member having a conductive second core wire; a first connector having an end of the first wiring member inserted thereinto; a second connector having an end of the second wiring member inserted thereinto, and being able to be fitted to the first connector; and the protector, wherein the first connector and the second connector electrically connect the first core wire and the second core wire in a fitting state, the base member includes a base body provided with the first connector and located in a center in the width direction, and base bilateral side portions provided with the respective guide grooves and located on bilateral sides in the width direction with respect to the base body, the pair of guide projections are disposed on bilateral sides in the width direction of the cover member, the cover member includes a first through opening through which the first wiring member is inserted at a detachment direction-side end, and a second through opening through which the second wiring member is inserted at an attachment direction-side end, the first wiring member is disposed on the base body along the detachment direction, the second wiring member is disposed on the base body along the attachment direction, and a wiring region in which the first wiring member and the second wiring member are disposed is formed between the pair of guide grooves in a state in which the second connector is fitted to the first connector.

To achieve the above object, an attachment method for a wire harness according to still another aspect of the present invention that includes a protector including a base member including a pair of guide grooves extending along an attachment direction in which a cover member is attached and disposed on respective bilateral sides in a width direction perpendicular to the attachment direction, a wall facing an attachment direction-side end of each of the guide grooves in the attachment direction, and a lock portion facing a detachment direction-side end of each of the guide grooves in a detachment direction opposite to the attachment direction, and the cover member attached to the base member and including a cover body having a cover opening, and guide projections inserted in the respective guide grooves, a first wiring member having a conductive first core wire, a second wiring member having a conductive second core wire, a first connector having an end of the first wiring member inserted thereinto, and a second connector having an end of the second wiring member inserted thereinto, and being able to be fitted to the first connector, the attachment method including: disposing the first wiring member along the detachment direction, and the first connector between the pair of guide grooves in the width direction of the base member; disposing the second wiring member along the attachment direction, and fitting the second connector to the first connector; attaching the base member to a vehicle body; inserting the pair of guide projections through the pair of guide grooves having a pair of groove through openings arranged facing each other in the width direction, and bringing each of the guide projections into contact with the lock portion in an upper/lower direction, to bring the lock portion into a retreating state; moving the cover member along the attachment direction with respect to the base member; and moving the cover member to an attachment position set between the wall and the lock portion in the attachment direction, to close the cover opening by the base member, and to regulate movement of the cover member in the attachment direction with the wall facing an attachment direction-side end of each of the guide projections in the attachment direction, and regulate movement of the cover member in the detachment direction with the lock portion facing a detachment direction-side end of each of the guide projections in the detachment direction, to attach the cover member to the base member.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment of a protector, a wire harness, and a method of manufacturing a wire harness according to the present invention will be described based on the drawings. Note that the embodiment does not intend to limit the present invention. Additionally, constituent elements in the following embodiment include those easily conceivable by a person skilled in the art, or those substantially identical with the constituent elements.

Figure 1:
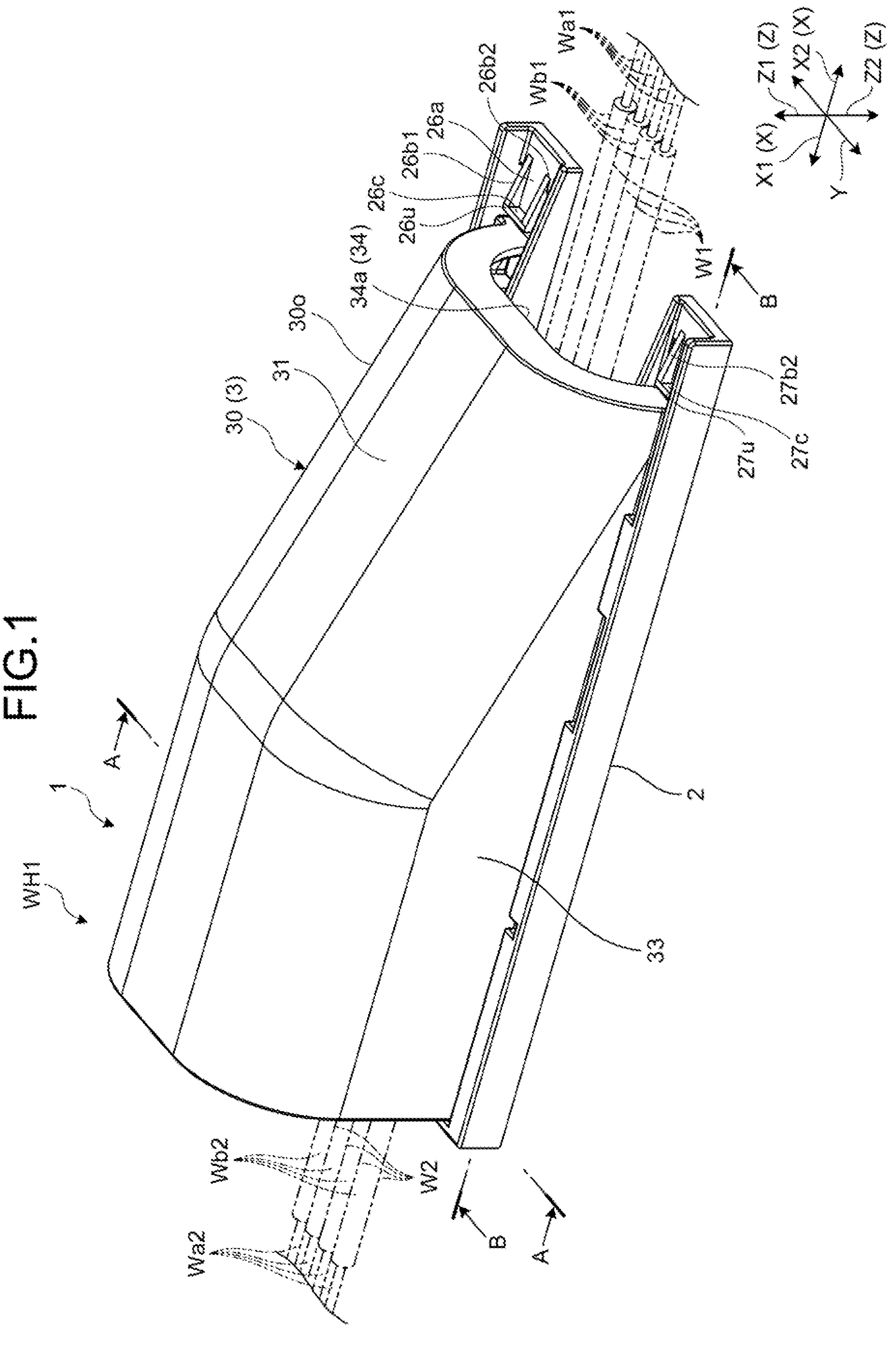
FIG. 1 is a perspective view of a wire harness including a protector according to the present embodiment.
Figure 2:
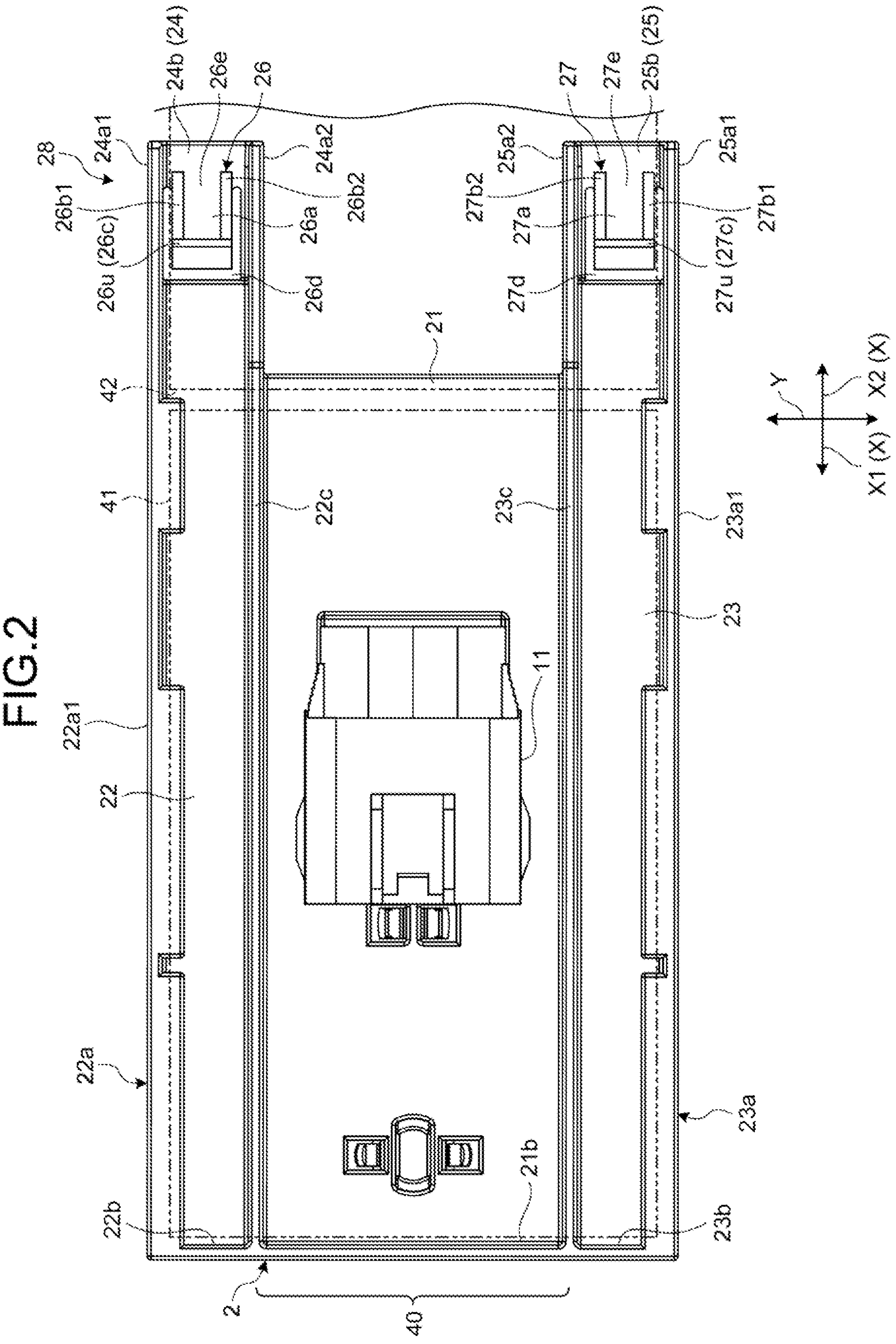
FIG. 2 is a plan view of a base member provided in the protector.
Figure 3:
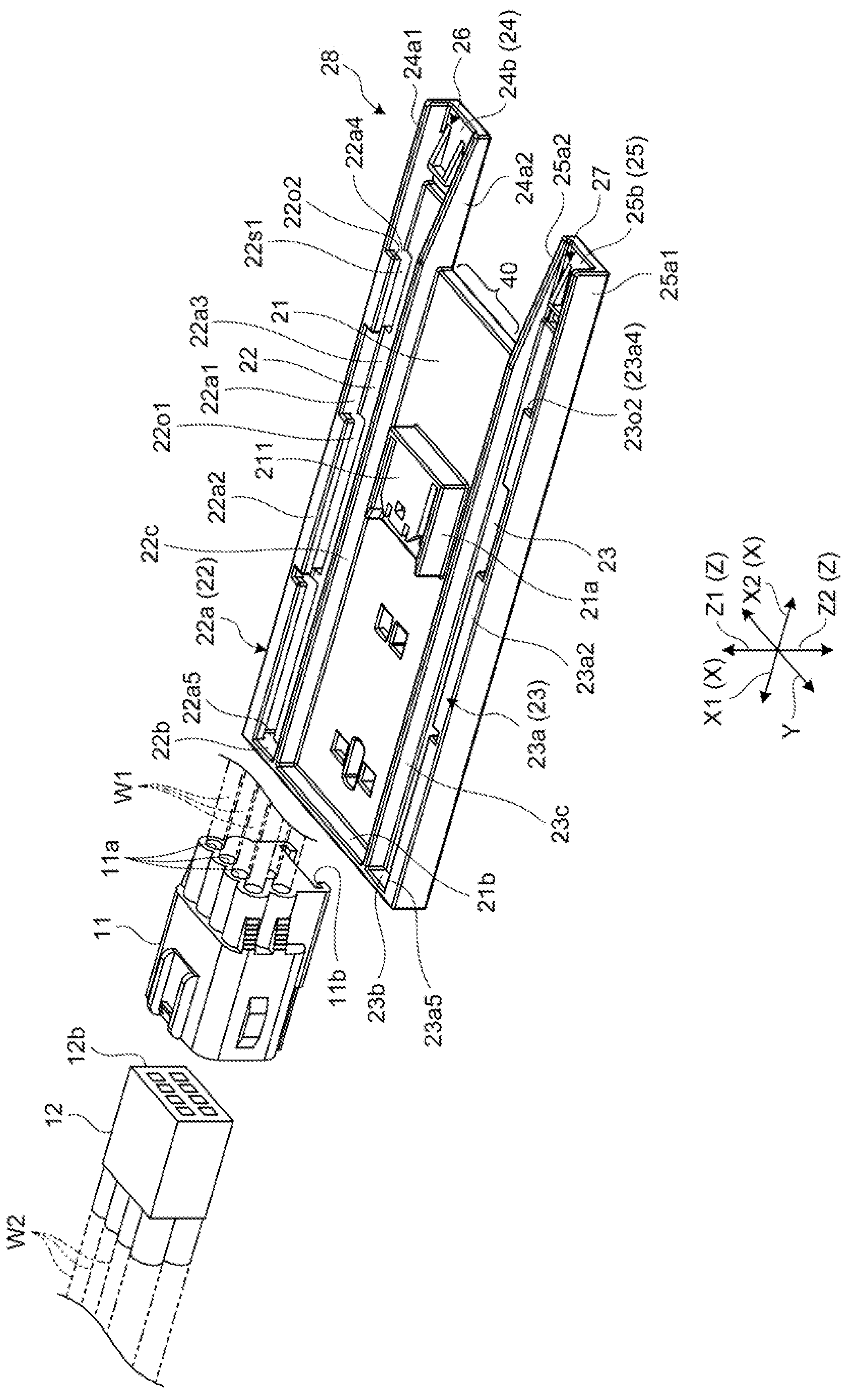
FIG. 3 is a perspective view of the wire harness according to the present embodiment.
Figure 4:
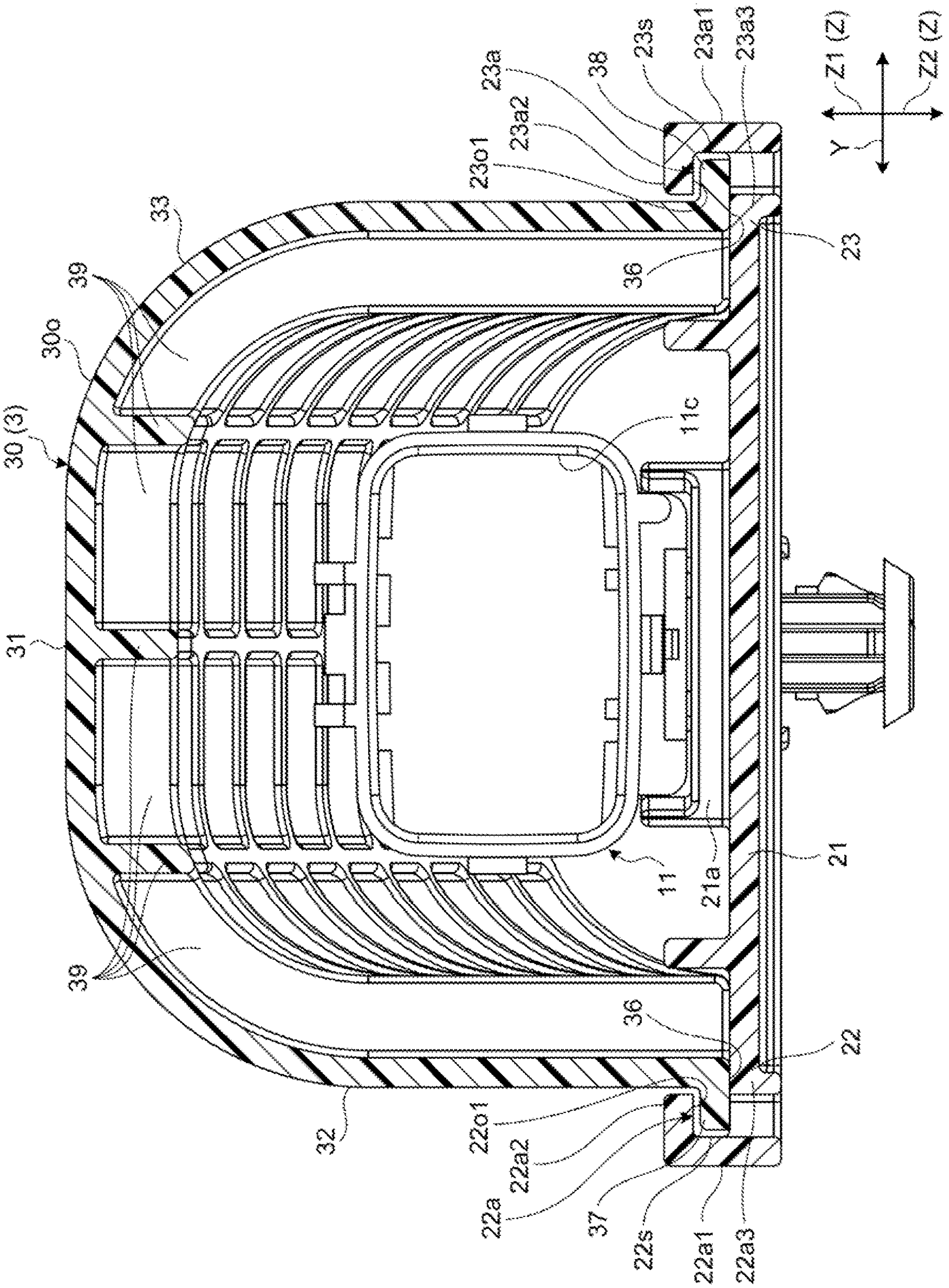
FIG. 4 is a cross-sectional view taken along a line indicated by an arrow A-A in FIG. 1.
Figure 5:
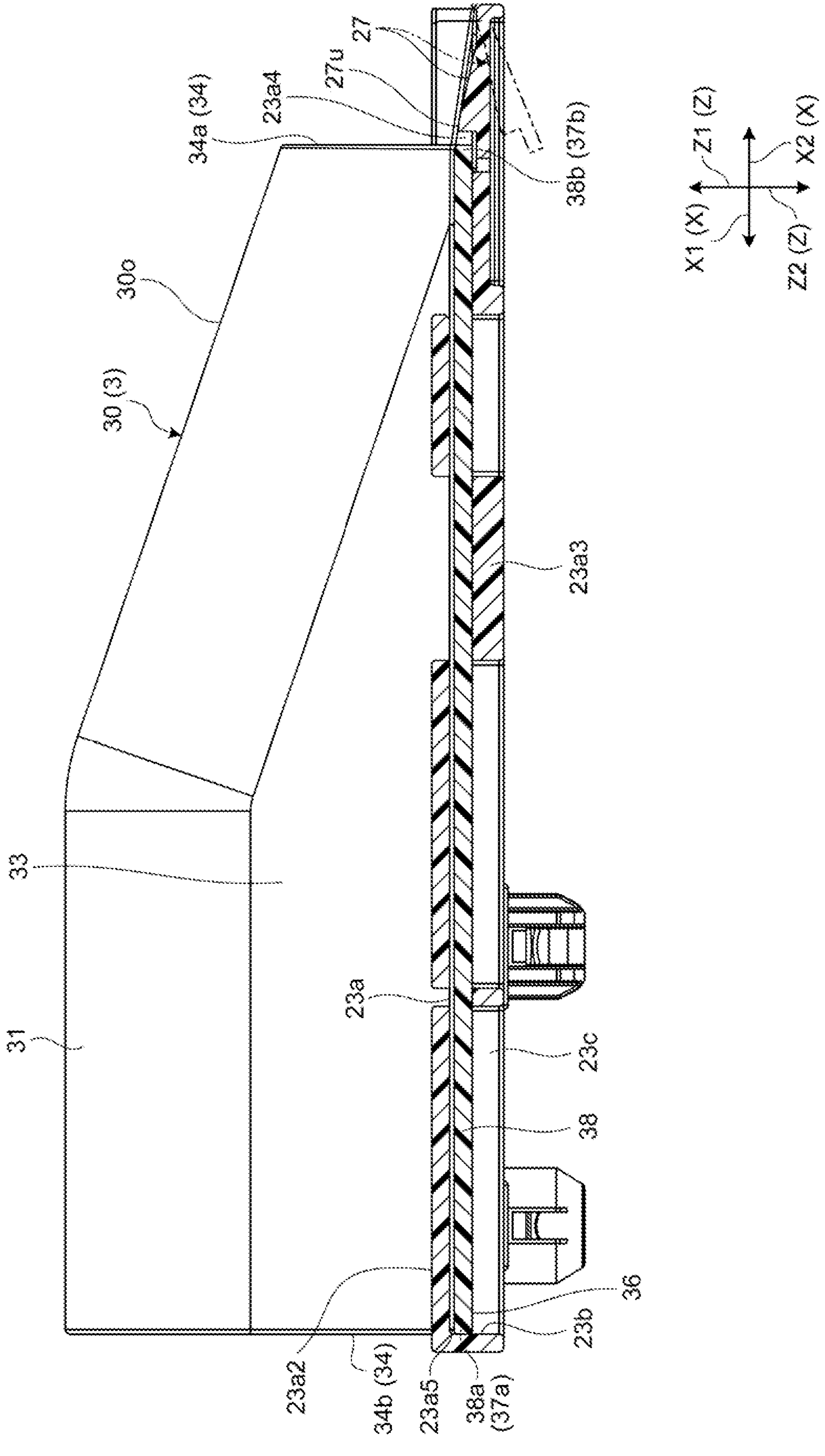
FIG. 5 is a cross-sectional view taken along a line indicated by an arrow B-B in FIG. 1.
Figure 6:
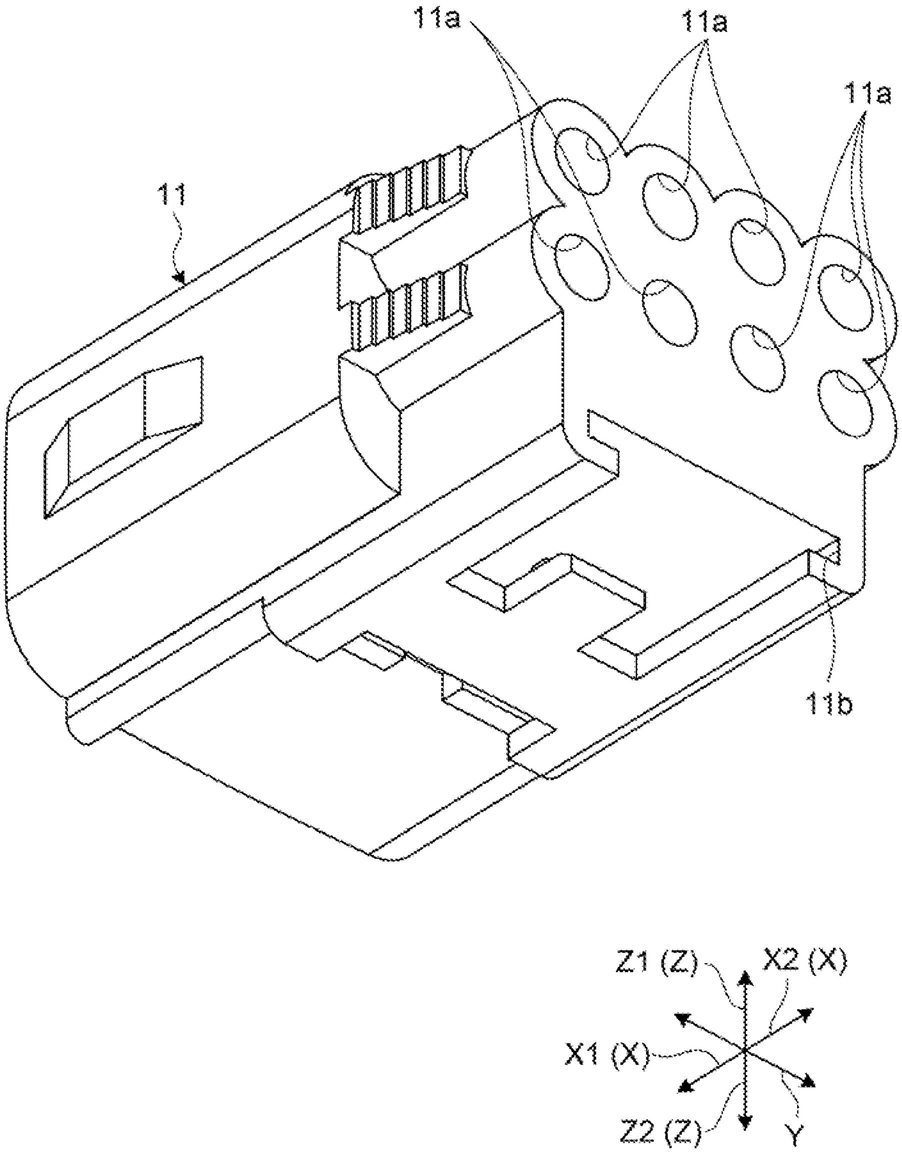
FIG. 6 is a perspective view of a first connector provided in the wire harness.
Figure 7:
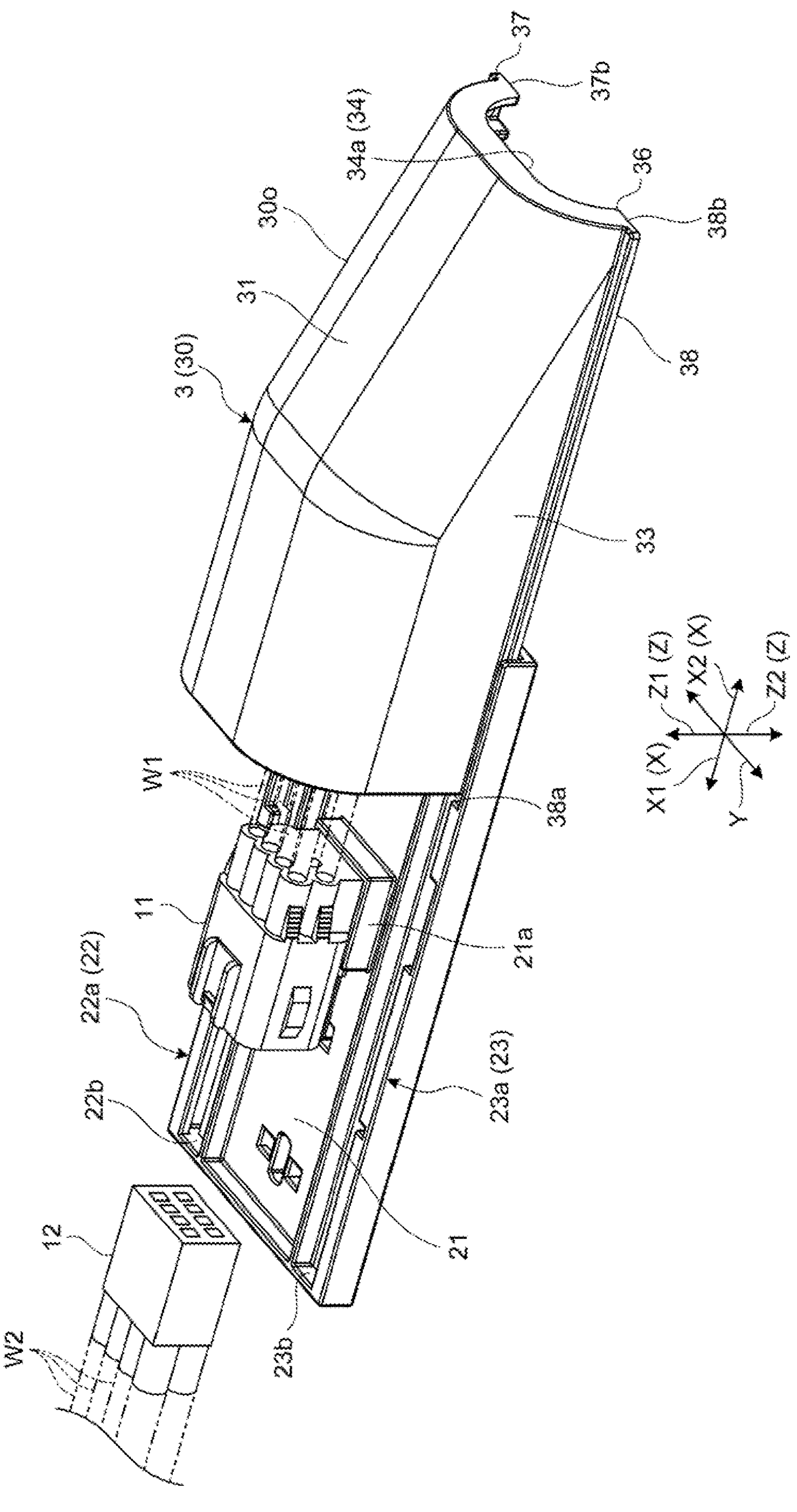
FIG. 7 is a perspective view illustrating a state in which guide projections face guide grooves in an attachment direction.

FIG. 1 is a perspective view of a wire harness WH1 including a protector 1 according to the present embodiment. FIG. 2 is a plan view of a base member 2 provided in the protector 1. FIG. 3 is a perspective view of the wire harness WH1 according to the present embodiment. FIG. 4 is a cross-sectional view taken along a line indicated by an arrow A-A in FIG. 1. FIG. 5 is a cross-sectional view taken along a line indicated by an arrow B-B in FIG. 1. FIG. 6 is a perspective view of a first connector 11 provided in the wire harness WH1. FIG. 7 is a perspective view illustrating a state in which guide projections 37 and 38 face guide grooves 22*a* and 23*a* in an attachment direction X1.

In the following description, reference character X1 denotes the attachment direction in the protector 1, the wire harness WH1, and the method of manufacturing the wire harness WH1 according to the present embodiment, and X2 denotes a detachment direction opposite to the attachment direction X1. Reference character X denotes an attachment/detachment direction including the attachment direction X1 and the detachment direction X2. Reference character Y denotes a width direction Y perpendicular to the attachment direction X1 and the detachment direction X2 in the protector 1, the wire harness WH1, and the method of manufacturing the wire harness WH1 according to the present embodiment. Reference character Z denotes an upper/lower direction perpendicular to the attachment/detachment direction X and the width direction Y in the protector 1, the wire harness WH1, and the method of manufacturing the wire harness WH1 according to the present embodiment. Reference character Z1 denotes an upper direction in the upper/lower direction Z, and Z2 denotes a lower direction in the upper/lower direction Z. In the protector 1 according to the present embodiment, the attachment/detachment direction X, the width direction Y, and the upper/lower direction Z are perpendicular to one another.

EMBODIMENT

The protector 1 according to the present embodiment illustrated in FIG. 1 protects a wiring member W by being incorporated in the wire harness WH1 that is mounted in a vehicle such as an automobile. For example, in order to connect various devices mounted in the vehicle, the wire harness WH1 bundles a plurality of wiring members W used for power supply and signal communication into an assembled component, and connects the wiring members W to the devices via a connector or the like.

The wire harness WH1 according to the present embodiment includes a first wiring member W1 having a conductive first core wire Wa1, a second wiring member W2 having a conductive second core wire Wa2, the first connector 11 having an end of the first wiring member W1 inserted thereinto, a second connector 12 having an end of the second wiring member W2 inserted thereinto, and the protector 1 that protects the first wiring member W1 and the second wiring member W2 from the outside. The first wiring member W1 and the second wiring member W2 are configured by, for instance, electric wires. In the electric wires, for example, the peripheries of the core wires Wa1 and Wa2, which are conductors each including a plurality of conductive metal strands, are covered with insulating coverings Wb1 and Wb2 (see FIG. 1). The wire harness WH1 may further include an electrical junction box, a grommet, a fixture, or the like. Hereinafter, the configuration of the protector 1 will be described in detail with reference to the drawings.

The first connector 11 is formed by, for instance, insulating synthetic resin. A plurality of first cavities 11*a* are formed in an upper portion in the upper/lower direction Z of the first connector 11 as illustrated in FIG. 3. The end of the first wiring member W1 is inserted into each of the first cavities 11*a*. The first connector 11 also has a connector engagement recessed portion 11*b* in a lower portion in the upper/lower direction Z. The first connector 11 further has a connector fitting recessed portion 11*c* into which the second connector 12 can be inserted, at its end on the attachment direction X1 side.

The second connector 12 is formed by, for instance, insulating synthetic resin. A plurality of second cavities are formed in an upper portion in the upper/lower direction Z of the second connector 12. The end of the second wiring member W2 is inserted into each of the second cavities. The second connector 12 also has a connector fitting projecting portion 12*b* to be inserted into the connector fitting recessed portion 11*c* of the first connector 11, at its end on the detachment direction X2 side.

The protector 1 is formed by an insulating synthetic resin material, and is disposed at, for example, the back side of the passenger's feet in the back seat of the vehicle. The protector 1 according to the present embodiment includes the base member 2 and a cover member 3 attached to the base member 2.

As illustrated in FIG. 2, the base member 2 includes a base body 21 located in the center in the width direction Y, a pair of base bilateral side portions 22 and 23 located on the bilateral sides in the width direction Y, and a pair of base projecting portions 24 and 25 projecting in the detachment direction X2 from ends on the detachment direction X2 side of the base bilateral side portions 22 and 23 as viewed from the upper/lower direction Z.

The base body 21 is formed in a rectangular planar shape, and a connector attachment portion 21*a* to which the first connector 11 is attached is provided on its upper surface side (see FIG. 3). The connector attachment portion 21*a* is provided in the center in the width direction Y of the base body 21. The connector attachment portion 21*a* is provided with a connector claw 211 that engages with the connector engagement recessed portion 11*b* of the first connector 11.

The base member 2 includes the pair of guide grooves 22*a* and 23*a* located in the base bilateral side portions 22 and 23, and a pair of first walls (walls) 22*b* and 23*b* located at ends on the attachment direction X1 side of the base bilateral side portions 22 and 23. The pair of guide grooves 22*a* and 23*a* extend along the attachment direction X1, and are disposed on the respective bilateral sides in the width direction Y. That is, the base member 2 includes the pair of guide grooves 22*a* and 23*a* extending along the attachment direction X1, and located on the respective bilateral sides in the width direction Y. The protector 1 according to the present embodiment is formed in line symmetry with respect to a center line located in the center in the width direction Y and extending along the attachment/detachment direction X. Thus, in the following description, the configuration of one side in the width direction Y will be described, while the description of the configuration of the other side in the width direction Y is omitted by enclosing the reference characters in parentheses.

Each guide groove 22*a* (23*a*) has a groove side wall 22*a*1 (23*a*1) extending in the upper/lower direction Z, a groove top wall 22*a*2 (23*a*2) extending from an upper end of the groove side wall 22*a*1 (23*a*1) to the inner side in the width direction Y, and a groove bottom wall 22*a*3 (23*a*3) extending from a lower end of the groove side wall 22*a*1 (23*a*1) to the inner side in the width direction Y as illustrated in FIG. 4. In each guide groove 22*a* (23*a*), a groove space 22*s* (23*s*) is formed by the groove side wall 22*a*1 (23*a*1), the groove top wall 22*a*2 (23*a*2), and the groove bottom wall 22*a*3 (23*a*3). The pair of guide grooves 22*a* and 23*a* also have respective groove through openings 22*o*1 and 23*o*1 facing each other in the width direction Y, and groove insertion openings 22*o*2 and 23*o*2 at detachment direction-side ends 22*a*4 and 23*a*4 (see FIG. 3).

As illustrated in FIG. 4, the groove through opening 22*o*1 (23*o*1) is formed by an end located on the inner side in the width direction Y of the groove top wall 22*a*2 (23*a*2), and the groove bottom wall 22*a*3 (23*a*3) facing the end in the upper/lower direction Z. When the cover member 3 is disposed at an attachment position 41 described later, the guide projections 37 and 38 of the cover member 3 are held between the groove top wall 22*a*2 (23*a*2) and the groove bottom wall 22*a*3 (23*a*3) in the upper/lower direction Z. Thus, when the cover member 3 is disposed at the attachment position 41, the pair of guide projections 37 (38) are fitted into the pair of guide grooves 22*a* and 23*a*, thereby regulating movement of the cover member 3 in the upper/lower direction Z with respect to the base member 2.

As illustrated in FIG. 3, the groove insertion opening 22*o*2 (23*o*2) is formed by an end on the detachment direction X2 side of the groove top wall 22*a*2 (23*a*2), the groove bottom wall 22*a*3 (23*a*3) facing the end in the upper/lower direction Z, and the groove side wall 22*a*1 (23*a*1) that couples the end and the groove bottom wall 22*a*3 (23*a*3) together.

The first wall (wall) 22*b* (23*b*) faces an end on the attachment direction side (attachment direction-side end) 22*a*5 (23*a*5) of the guide groove 22*a* (23*a*) in the attachment direction X1. That is, the base member 2 includes the first wall (wall) 22*b* (23*b*) facing the attachment direction-side end 22*a*5 (23*a*5) of the guide groove 22*a* (23*a*) in the attachment direction X1.

The base member 2 further includes a first coupling wall 21*b* that couples the pair of first walls 22*b* and 23*b* together in the width direction Y, and second walls 22*c* and 23*c* respectively facing the groove side walls 22*a*1 and 23*a*1 in the width direction Y.

The first coupling wall 21*b* is provided on the upper surface of the base body 21. The first coupling wall 21*b* and the pair of first walls 22*b* and 23*b* are arranged continuously and linearly along the width direction Y.

The second wall 22*c* (23*c*) extends along the attachment/detachment direction X and is arranged linearly. The second wall 22*c* (23*c*) is also arranged parallel to the groove side wall 22*a*1 (23*a*1). The guide projection 37 (38) of the cover member 3 is disposed between the second wall 22*c* (23*c*) and the groove side wall 22*a*1 (23*a*1) of the base bilateral side portion 22 (23) when the cover member 3 is disposed at the attachment position 41 described later.

Each base projecting portion 24 (25) has a lock portion 26 (27). The lock portion 26 (27) faces the detachment direction-side end of the guide groove 22*a* (23*a*) in the detachment direction X2. Each lock portion 26 (27) has a lock base 26*a* (27*a*), a pair of lock facing walls 26*b*1 and 26*b*2 (27*b*1 and 27*b*2), and a lock coupling wall 26*c* (27*c*).

The lock base 26*a* (27*a*) is formed in a rectangular planar shape. The pair of lock facing walls 26*b*1 and 26*b*2 (27*b*1 and 27*b*2) are provided on an upper surface of the lock base 26*a* (27*a*). One facing wall 26*b*1 (27*b*1) and the other facing wall 26*b*2 (27*b*2) of the pair of lock facing walls 26*b*1 and 26*b*2 (27*b*1 and 27*b*2) face each other in the width direction Y. Each of the lock facing walls 26*b*1 and 26*b*2 (27*b*1 and 27*b*2) is formed in a triangular shape, the height of which is greatest on the attachment direction X1 side, and is gradually reduced toward the detachment direction X2. Each lock coupling wall 26*c* (27*c*) couples ends on the attachment direction X1 side of the lock facing walls 26*b*1 and 26*b*2 (27*b*1 and 27*b*2) together. An upper end 26*u* (27*u*) of the lock coupling wall 26*c* (27*c*) is located at the top of each lock portion 26 (27).

In each lock portion 26 (27), a cutout 26*d* (27*d*) is disposed on three sides out of the four sides, and a lock coupled portion 26*e* (27*e*) coupled to the base projecting portion 24 (25) is provided on the remaining one side as viewed from the upper/lower direction Z. More specifically, the lock coupled portion 26*e* (27*e*) coupled to the base projecting portion 24 (25) is provided on the detachment direction X2 side as viewed from the upper/lower direction Z. Meanwhile, the cutout 26*d* (27*d*) is provided on the attachment direction X1 side and the bilateral sides in the width direction Y as viewed from the upper/lower direction Z. The lock portion 26 (27) is provided in the base projecting portion 24 (25) as described above, so that the lock coupled portion 26*e* (27*e*) elastically deformed, and the lock portion 26 (27) is deformed into an advancing state (indicated by a solid line in FIG. 5) in which the upper end 26*u* (27*u*) advances upward and into a retreating state (indicated by a virtual line in FIG. 5) in which the upper end 26*u* (27*u*) retreats downward from the advancing state.

The lock portion 26 (27) in the advancing state faces the end on the detachment direction side (detachment direction-side end) 22*a*4 (23*a*4) of the guide groove 22*a* (23*a*) in the detachment direction X2 as illustrated in FIG. 5. That is, the base member 2 includes the pair of lock portions 26 (27) facing the ends on the detachment direction side (detachment direction-side ends) 22*a*4 and 23*a*4 of the guide grooves 22*a* and 23*a* in the detachment direction X2.

Each base projecting portion 24 (25) illustrated in FIG. 2 further has a pair of base facing walls 24*a*1 and 24*a*2 (25*a*1 and 25*a*2) facing each other in the width direction Y, and a base coupling wall 24*b* (25*b*) that couples the pair of base facing walls 24*a*1 and 24*a*2 (25*a*1 and 25*a*2) together in the width direction Y.

The outer base facing wall 24*a*1 (25*a*1) located on the outer side in the width direction Y of the pair of base facing walls 24*a*1 and 24*a*2 (25*a*1 and 25*a*2) is formed continuously from the above groove side wall 22*a*1 (23*a*1), and extends in the detachment direction X2. The outer base facing wall 24*a*1 (25*a*1) and the groove side wall 22*a*1 (23*a*1) are arranged linearly along the attachment/detachment direction X.

The inner base facing wall 24*a*2 (25*a*2) located on the inner side in the width direction Y of the pair of base facing walls 24*a*1 and 24*a*2 (25*a*1 and 25*a*2) is formed continuously from the above second wall 22*c* (23*c*), and extends in the detachment direction X2. The inner base facing wall 24*a*2 (25*a*2) and the second wall 22*c* (23*c*) are arranged linearly along the attachment/detachment direction X.

Moreover, a width between the pair of base facing walls 24*a*1 and 24*a*2 (25*a*1 and 25*a*2) in the width direction Y is larger than a width of cover bilateral side portion 32 (33) of the cover member 3. Such a configuration enables a lower end of the cover bilateral side portion 32 (33) to be placed on an upper surface of the base coupling wall 24*b* (25*b*) between the pair of base facing walls 24*a*1 and 24*a*2 (25*a*1 and 25*a*2) of the base member 2. As illustrated in FIG. 2, the pair of base facing walls 24*a*1 and 24*a*2 (25*a*1 and 25*a*2) and the base coupling wall 24*b* (25*b*) constitute a positioning portion 28 that determines a placing position 42 of the cover member 3 on the base member 2 in the width direction Y. The placing position 42 is provided adjacent to the attachment position 41 in the attachment/detachment direction X.

As illustrated in FIG. 1, the cover member 3 has an accommodating space 3*s* formed in a gutter shape opened at both ends in the attachment/detachment direction X and at one end in the upper/lower direction Z (a lower end in the upper/lower direction Z). In the protector 1 according to the present embodiment, the first connector 11, the second connector 12, the first wiring member W1, and the second wiring member W2 are accommodated in the accommodating space 3*s* of the cover member 3 when the cover member 3 is disposed at the attachment position 41. That is, in the protector 1, the first connector 11, the second connector 12, the first wiring member W1, and the second wiring member W2 are accommodated in the accommodating space 3*s* of the cover member 3.

As illustrated in FIG. 4, the cover member 3 includes a cover body 30, and the pair of guide projections 37 and 38 projecting from an outer surface 30*o* of the cover body 30. The cover body 30 has the pair of cover bilateral side portions 32 and 33 located on the bilateral sides and facing each other in the width direction Y, and a cover center portion 31 located between the pair of cover bilateral side portions 32 and 33.

The cover member 3 includes a cover through opening 34 at both ends in the attachment/detachment direction X (see FIG. 1), and a cover opening/closing opening (cover opening) 36 at one end in the upper/lower direction Z (more specifically, the lower end in the upper/lower direction Z) (see FIG. 7).

The cover through opening 34 is an opening through which the first wiring member W1 and the second wiring member W2 are inserted into the accommodating space 3*s* from the outside. The cover through opening 34 has a first cover through opening 34*a* through which the first wiring member W1 is inserted at the detachment direction-side end of the cover member 3, and a second cover through opening 34*b* through which the second wiring member W2 is inserted at the attachment direction-side end of the cover member 3. That is, the cover member 3 includes the first cover through opening 34*a* through which the first wiring member W1 is inserted at the detachment direction-side end, and the second cover through opening 34*b* through which the second wiring member W2 is inserted at the attachment direction-side end. The first cover through opening 34*a* and the second cover through opening 34*b* are opened along the width direction Y and the upper/lower direction Z.

The cover opening/closing opening 36 illustrated in FIG. 4 is an opening for opening the accommodating space 3*s* to the outside, and closed by the base member 2. The cover opening/closing opening 36 according to the present embodiment is closed by the base member 2 after attaching the first connector 11 to the base member 2, and fitting the second connector 12 to the first connector 11. The cover opening/closing opening 36 is located at one end in the upper/lower direction Z (the lower end in the upper/lower direction Z) of the cover member 3, and is formed opposite to the side where the cover center portion 31 is formed in the upper/lower direction Z.

The cover member 3 includes the pair of guide projections 37 and 38 formed projecting from the outer surface 30*o* of the cover body 30 and inserted into the respective guide grooves 22*a* and 23*a*. That is, the cover member 3 includes the pair of guide projections 37 and 38 formed projecting from the outer surface 30*o* of the cover body 30 and inserted into the respective guide grooves 22*a* and 23*a*. The cover member 3 can slide along the attachment direction X1 with respect to the base member 2 with the guide projections 37 and 38 inserted into the respective guide grooves 22*a* and 23*a*.

The pair of guide projections 37 and 38 are formed so as to extend away from each other in the width direction Y from the outer surface 30*o* of the cover body 30 and extend in the attachment/detachment direction X. The guide projections 37 and 38 according to the present embodiment are respectively provided in the entire region in the attachment/detachment direction X of the cover bilateral side portions 32 and 33. The guide projections 37 and 38 respectively have attachment direction-side ends 37*a* and 38*a* on the attachment direction X1 side, and detachment direction-side ends 37*b* and 38*b* on the detachment direction X2 side. Since the pair of guide projections 37 and 38 according to the present embodiment are formed projecting from the outer surface 30*o* of the cover member 3, in the protector 1 according to the present embodiment, the guide projections 37 and 38 serve as ribs, and the guide projections 37 and 38 can improve the strength of the cover member 3. As illustrated in FIG. 4, the cover member 3 is also provided with a plurality of ribs 39 projecting from an inner surface 30*i* of the cover member 3 toward the accommodating space 3*s*.

Next, the attachment method for the wire harness WH1 according to the present embodiment will be described. First, an operator disposes the first wiring member W1 along the detachment direction X2, and attaches the first connector 11 to the connector attachment portion 21*a* of the base member 2. That is, the operator disposes the first wiring member W1 along the detachment direction X2, and the first connector 11 between the pair of guide grooves 22*a* and 23*a* in the width direction Y of the base member 2.

The operator then disposes the second wiring member W2 along the attachment direction X1, and fits the second connector 12 to the first connector 11. That is, the operator disposes the second wiring member W2 along the attachment direction X1, and fits the second connector 12 to the first connector 11. In a state in which the second connector 12 is fitted to the first connector 11, the base member 2 has a wiring region 40 formed on the upper surface of the base member 2, in which the first wiring member W1 and the second wiring member W2 are disposed between the pair of guide grooves 22*a* and 23*a*.

Subsequently, the operator attaches the base member 2 to a vehicle body.

The operator then inserts the pair of guide projections 37 and 38 through the pair of guide grooves 22*a* and 23*a* having the pair of groove through openings 22*o*1 and 23*o*1 arranged facing each other in the width direction Y. The guide projections 37 and 38 thereby come into contact with the lock portions 26 and 27 in the upper/lower direction Z, so that the lock portions 26 and 27 are in the retreating state.

Subsequently, the operator moves the cover member 3 along the attachment direction X1 with respect to the base member 2. At this time, the lock portions 26 and 27 are maintained in the retreating state with the guide projections 37 and 38 remaining in contact therewith in the upper/lower direction Z.

The operator then moves the cover member 3 to the attachment position 41. The cover opening/closing opening (cover opening) 36 is thereby closed by the base member 2. At this time, the lock portions 26 and 27 are separated from the guide projections 37 and 38 in the upper/lower direction Z to be in the advancing state from the retreating state. At the same time, the first walls 22*b* and 23*b* face the attachment direction-side ends 37*a* and 38*a* of the guide projections 37 and 38 in the attachment direction X1, thereby regulating movement of the cover member 3 in the attachment direction X1. At the same time, the lock portions 26 and 27 face the detachment direction-side ends 37*b* and 38*b* of the guide projections 37 and 38 in the detachment direction X2, thereby regulating movement of the cover member 3 in the detachment direction X2. The cover member 3 is thereby attached to the base member 2.

The protector 1 according to the present embodiment has the following configuration. The protector 1 includes the base member 2 and the cover member 3. The base member 2 includes the pair of guide grooves 22*a* and 23*a* extending along the attachment direction X1 in which the cover member 3 is attached to the base member 2 and disposed on the respective bilateral sides in the width direction Y perpendicular to the attachment direction X1, the walls 22*b* and 23*b* facing the attachment direction-side ends 22*a*5 and 23*a*5 of the guide grooves 22*a* and 23*a* in the attachment direction X1, and the lock portions 26 and 27 facing the detachment direction-side ends 22*a*4 and 23*a*4 of the guide grooves 22*a* and 23*a* in the detachment direction X2 opposite to the attachment direction X1. Thus, in accordance with the protector 1 according to the present embodiment, the operation of locking the cover member 3 to the base member 2, and the operation of closing the cover opening/closing opening (cover opening) 36 of the cover member 3 can be performed at the same time by sliding the cover member 3 in the attachment direction X1 with respect to the base member 2. As a result, the protector 1 according to the present embodiment can facilitate the attachment operation of attaching the cover member 3 to the base member 2. Moreover, in the protector 1 according to the present embodiment, when the cover member 3 is disposed at the attachment position 41, the guide projections 37 and 38 are inserted in the pair of groove through openings 22*o*1 and 23*o*1 facing each other in the width direction Y. Thus, the movement of the cover member 3 in the upper/lower direction Z with respect to the base member 2 is regulated. Furthermore, the pair of guide projections 37 and 38 according to the present embodiment are formed projecting from the outer surface 30*o* of the cover member 3. Thus, in the protector 1 according to the present embodiment, the guide projections 37 and 38 serve as the ribs, and the guide projections 37 and 38 can improve the strength of the cover member 3.

The protector 1 according to the present embodiment has the following configuration. The lock portions 26 and 27 are located outside the cover member 3 in the detachment direction X2, to be exposed from the cover member 3 as viewed from above when the cover member 3 is moved to the attachment position 41. Thus, the protector 1 according to the present embodiment enables the operator to easily check whether the lock portions 26 and 27 are in the advancing state or the retreating state. As a result, in the protector 1 according to the present embodiment, it is possible to easily check whether the cover member 3 is certainly attached to the base member 2.

The wire harness WH1 according to the present embodiment has the following configuration. The base member 2 includes the base body 21 provided with the first connector 11 and located in the center in the width direction Y, and the base bilateral side portions 22 and 23 provided with the respective guide grooves 22*a* and 23*a* and located on the bilateral sides in the width direction Y with respect to the base body 21. In a state in which the second connector 12 is fitted to the first connector 11, the wiring region 40 in which the first wiring member W1 and the second wiring member W2 are disposed is formed between the pair of guide grooves 22*a* and 23*a*. Thus, in accordance with the wire harness WH1 according to the present embodiment, the cover member 3 can be attached to the base member 2 by moving the cover member 3 in the attachment direction X1 with respect to the base member 2 even in the state in which the first connector 11 is provided in the base member 2 and the second connector 12 is fitted to the first connector 11 to electrically connect the first core wire Wa1 and the second core wire Wa2.

The attachment method for the wire harness WH1 according to the present embodiment includes the following steps: inserting the pair of guide projections 37 and 38 through the pair of guide grooves 22*a* and 23*a* having the pair of groove through openings 22*o*1 and 23*o*1 arranged facing each other in the width direction Y, and bringing the guide projections 37 and 38 into contact with the lock portions 26 and 27, to bring the lock portions 26 and 27 into the retreating state; moving the cover member 3 along the attachment direction X1 with respect to the base member 2; and moving the cover member 3 to the attachment position 41 set between the walls 22*b* and 23*b* and the lock portions 26 and 27 in the attachment direction X1, so as to regulate the movement of the cover member 3 in the attachment direction X1 with the walls 22*b* and 23*b* facing the attachment direction-side ends 37*a* and 38*a* of the guide projections 37 and 38 in the attachment direction X1, and regulate the movement of the cover member 3 in the detachment direction X2 with the lock portions 26 and 27 facing the detachment direction-side ends 37*b* and 38*b* of the guide projections 37 and 38 in the detachment direction X2, to attach the cover member 3 to the base member 2. Thus, in accordance with the attachment method for the wire harness WH1 according to the present embodiment, the operation of locking the cover member 3 to the base member 2, and the operation of closing the cover opening/closing opening (cover opening) 36 of the cover member 3 can be performed at the same time by sliding the cover member 3 in the attachment direction X1 with respect to the base member 2. As a result, the attachment method for the wire harness WH1 according to the present embodiment can facilitate the attachment operation of attaching the cover member 3 to the base member 2. Moreover, in accordance with the attachment method for the wire harness WH1 according to the present embodiment, the cover member 3 can be attached to the base member 2 by moving the cover member 3 in the attachment direction X1 with respect to the base member 2 even in the state in which the first connector 11 is provided in the base member 2 and the second connector 12 is fitted to the first connector 11 to electrically connect the first core wire Wa1 and the second core wire Wa2.

For the protector 1 and the wire harness WH1 in the above embodiment, the case in which the first coupling wall 21*b* is provided between the first wall 22*b* and the first wall 23*b* in the width direction Y has been described. However, the protector 1 and the wire harness WH1 according to the present embodiment are not limited to this configuration. The first coupling wall 21*b* does not necessarily have to be provided between the first wall 22*b* and the first wall 23*b* in the width direction Y.

The protector, the wire harness, and the attachment method for the wire harness according to the present embodiment have the configuration as described above, and thus, can facilitate the attachment operation of attaching the cover member to the base member.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A protector comprising:

a base member; and a cover member attached to the base member, wherein the base member includes a pair of guide grooves extending along an attachment direction in which the cover member is attached to the base member and disposed on respective bilateral sides in a width direction perpendicular to the attachment direction, a wall facing an attachment direction-side end of each of the guide grooves in the attachment direction, and a lock portion facing a detachment direction-side end of each of the guide grooves in a detachment direction opposite to the attachment direction, the pair of guide grooves have a pair of groove through openings facing each other in the width direction, the cover member includes a cover body having a cover opening, and a pair of guide projections formed projecting from an outer surface of the cover body, and inserted in the respective guide grooves through the groove through openings, and is movable along the attachment direction with respect to the base member with the guide projections inserted in the respective guide grooves, and the cover opening is closed by the base member when the cover member is moved to an attachment position set between the wall and the lock portion in the attachment direction, the wall faces an attachment direction-side end of each of the guide projections in the attachment direction, regulating movement of the cover member in the attachment direction, when the cover member is moved to the attachment position, the lock portion is formed elastically deformable, and comes into contact with each of the guide projections in an upper/lower direction to be in a retreating state while the cover member is moving along the attachment direction with the guide projections inserted in the guide grooves, and is separated from each of the guide projections in the upper/lower direction to be in an advancing state when the cover member is moved to the attachment position, and the lock portion is in the advancing state when the cover member is moved to the attachment position, and faces a detachment direction-side end of each of the guide projections in the detachment direction, regulating movement of the cover member in the detachment direction.

2. The protector according to claim 1, wherein the lock portion is located outside the cover member in the detachment direction, to be exposed from the cover member as viewed from above when the cover member is moved to the attachment position.

3. A wire harness comprising:

a first wiring member having a conductive first core wire;

a second wiring member having a conductive second core wire;

a first connector having an end of the first wiring member inserted thereinto;

a second connector having an end of the second wiring member inserted thereinto, and being able to be fitted to the first connector; and the protector according to claim 1, wherein the first connector and the second connector electrically connect the first core wire and the second core wire in a fitting state, the base member includes a base body provided with the first connector and located in a center in the width direction, and base bilateral side portions provided with the respective guide grooves and located on bilateral sides in the width direction with respect to the base body, the pair of guide projections are disposed on bilateral sides in the width direction of the cover member, the cover member includes a first through opening through which the first wiring member is inserted at a detachment direction-side end, and a second through opening through which the second wiring member is inserted at an attachment direction-side end, the first wiring member is disposed on the base body along the detachment direction, the second wiring member is disposed on the base body along the attachment direction, and a wiring region in which the first wiring member and the second wiring member are disposed is formed between the pair of guide grooves in a state in which the second connector is fitted to the first connector.

4. A wire harness comprising:

a first wiring member having a conductive first core wire;

a second wiring member having a conductive second core wire;

a first connector having an end of the first wiring member inserted thereinto;

a second connector having an end of the second wiring member inserted thereinto, and being able to be fitted to the first connector; and the protector according to claim 2, wherein the first connector and the second connector electrically connect the first core wire and the second core wire in a fitting state, the base member includes a base body provided with the first connector and located in a center in the width direction, and base bilateral side portions provided with the respective guide grooves and located on bilateral sides in the width direction with respect to the base body, the pair of guide projections are disposed on bilateral sides in the width direction of the cover member, the cover member includes a first through opening through which the first wiring member is inserted at a detachment direction-side end, and a second through opening through which the second wiring member is inserted at an attachment direction-side end, the first wiring member is disposed on the base body along the detachment direction, the second wiring member is disposed on the base body along the attachment direction, and a wiring region in which the first wiring member and the second wiring member are disposed is formed between the pair of guide grooves in a state in which the second connector is fitted to the first connector.

5. An attachment method for a wire harness that comprises:

a protector including a base member including a pair of guide grooves extending along an attachment direction in which a cover member is attached and disposed on respective bilateral sides in a width direction perpendicular to the attachment direction, a wall facing an attachment direction-side end of each of the guide grooves in the attachment direction, and a lock portion facing a detachment direction-side end of each of the guide grooves in a detachment direction opposite to the attachment direction, and the cover member attached to the base member and including a cover body having a cover opening, and guide projections inserted in the respective guide grooves, a first wiring member having a conductive first core wire, a second wiring member having a conductive second core wire, a first connector having an end of the first wiring member inserted thereinto, and a second connector having an end of the second wiring member inserted thereinto, and being able to be fitted to the first connector, the attachment method comprising:

disposing the first wiring member along the detachment direction, and the first connector between the pair of guide grooves in the width direction of the base member;

disposing the second wiring member along the attachment direction, and fitting the second connector to the first connector;

attaching the base member to a vehicle body;

inserting the pair of guide projections through the pair of guide grooves having a pair of groove through openings arranged facing each other in the width direction, and bringing each of the guide projections into contact with the lock portion in an upper/lower direction, to bring the lock portion into a retreating state;

moving the cover member along the attachment direction with respect to the base member; and moving the cover member to an attachment position set between the wall and the lock portion in the attachment direction, to close the cover opening by the base member, and to regulate movement of the cover member in the attachment direction with the wall facing an attachment direction-side end of each of the guide projections in the attachment direction, and regulate movement of the cover member in the detachment direction with the lock portion facing a detachment direction-side end of each of the guide projections in the detachment direction, to attach the cover member to the base member.

* * * * *